(No Model.) 6 Sheets—Sheet 1.
M. J. HAWKINS.
MACHINE FOR SOLDERING CAPS ON CANS.
No. 568,849. Patented Oct. 6, 1896.
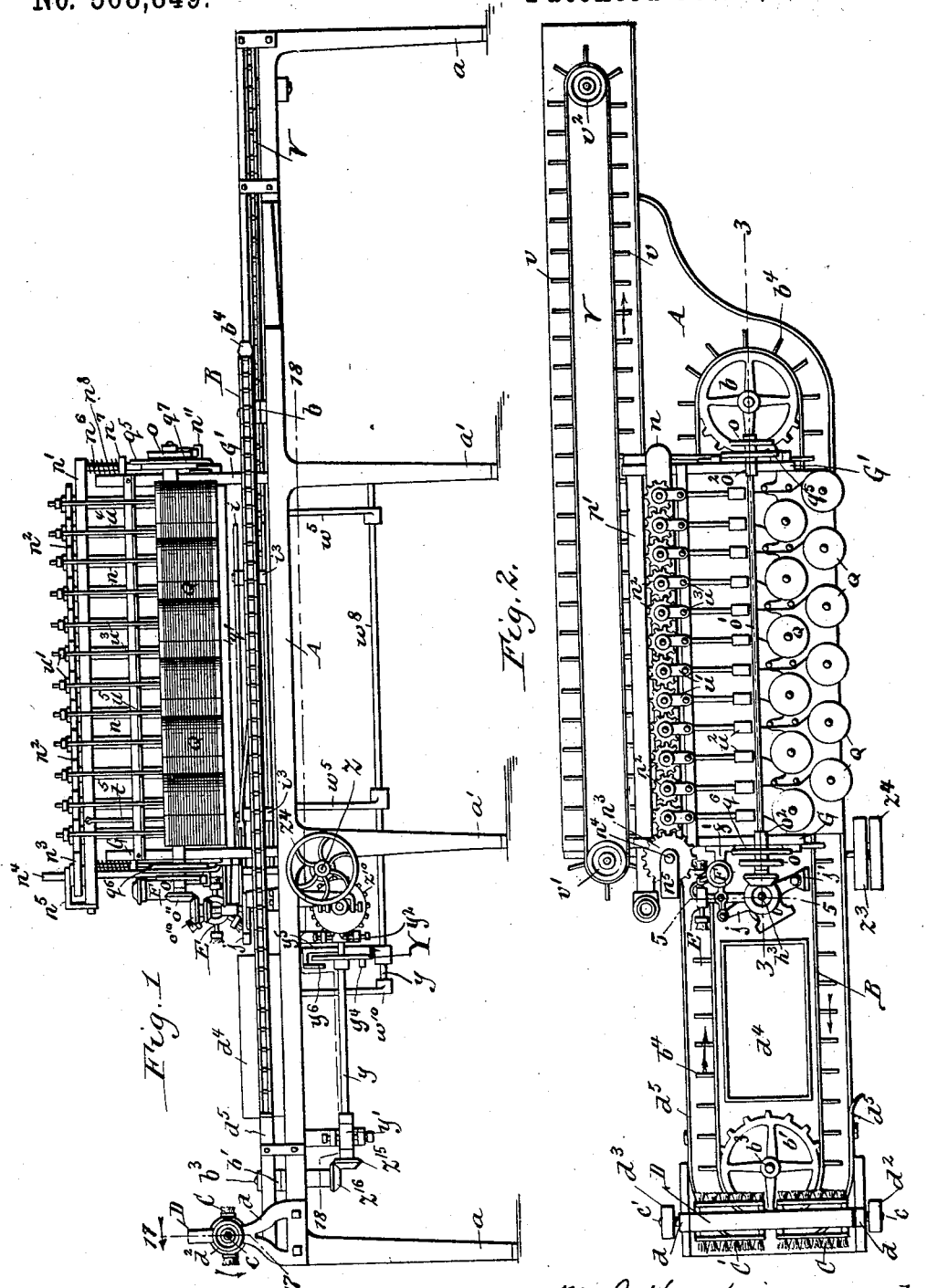
Witnesses:
Theo. L. Popp
Henry L. Deck
M. J. Hawkins, Inventor.
By Wilhelm Bonner,
Attorneys.

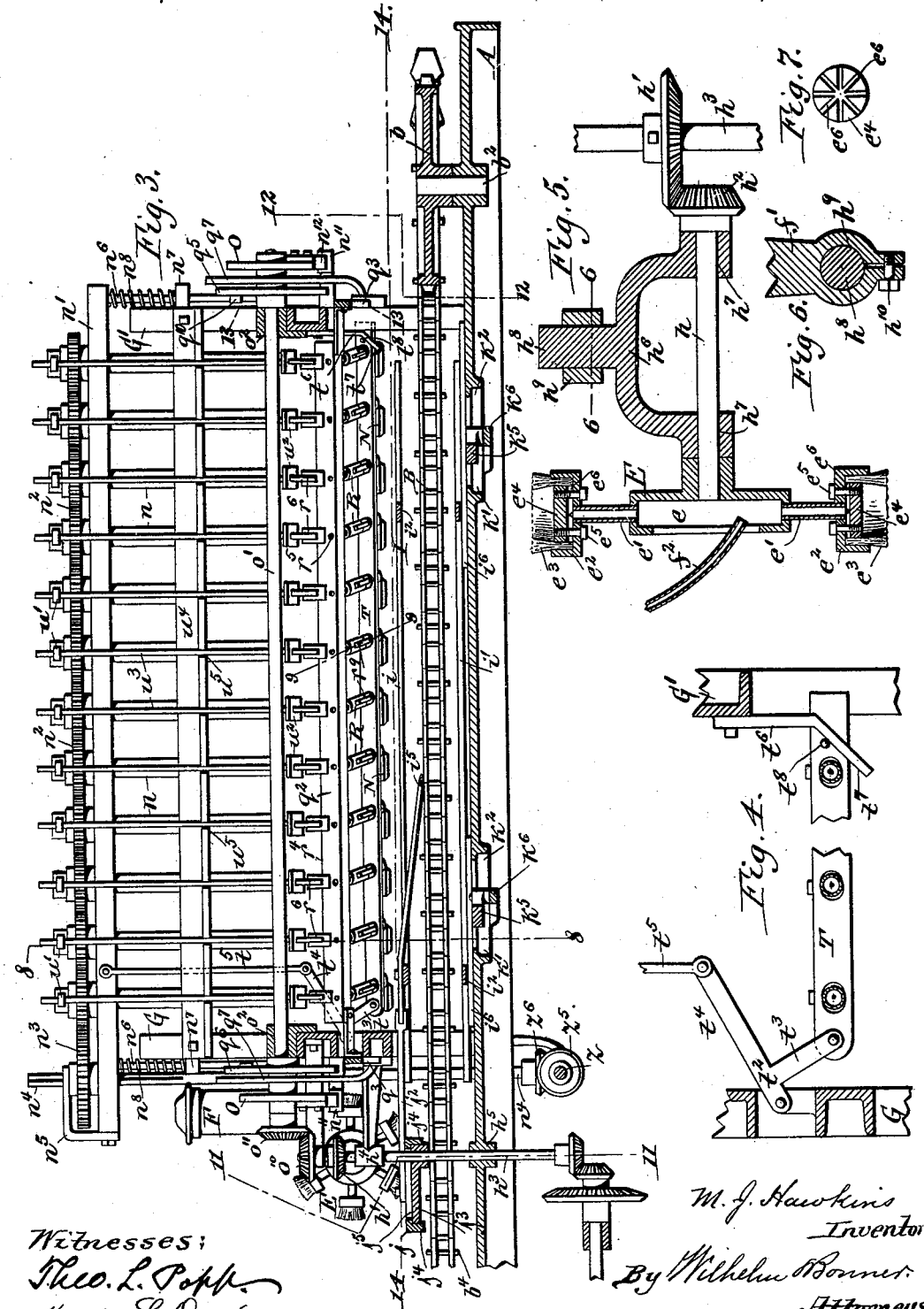

(No Model.) 6 Sheets—Sheet 3.
M. J. HAWKINS.
MACHINE FOR SOLDERING CAPS ON CANS.
No. 568,849. Patented Oct. 6, 1896.
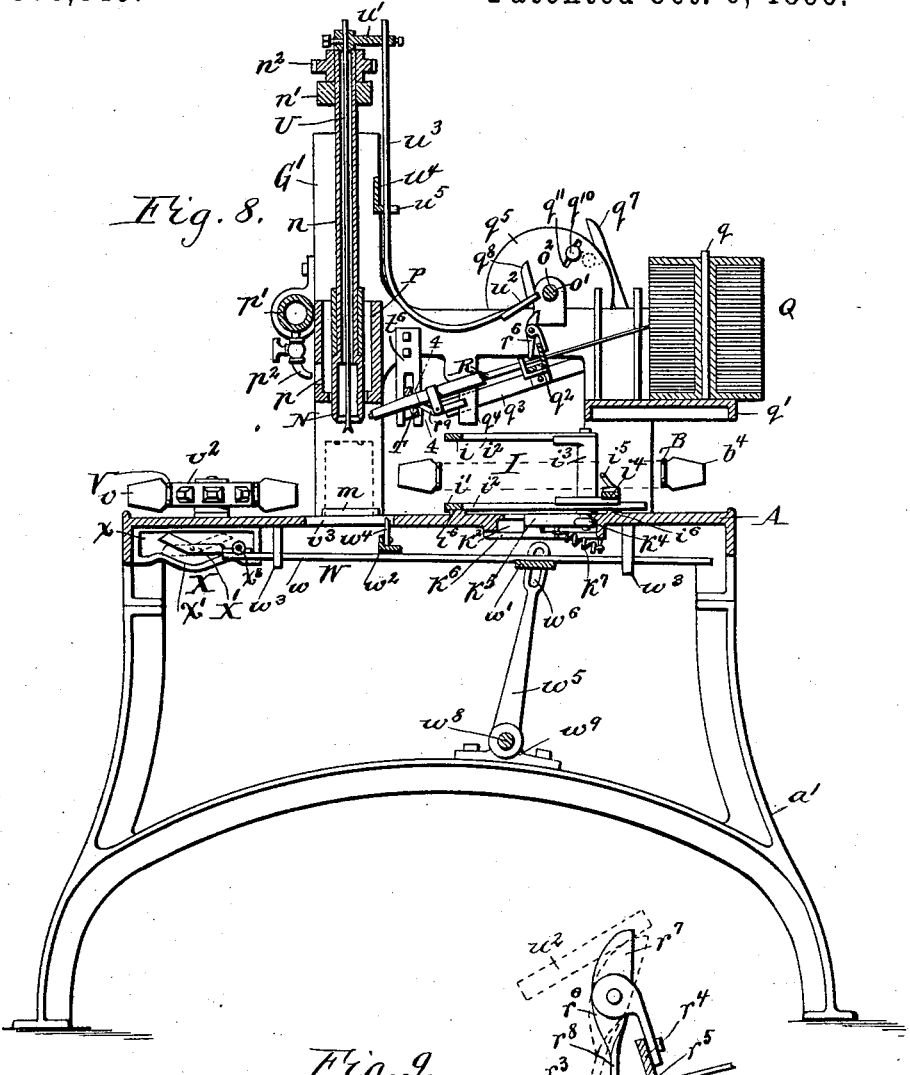
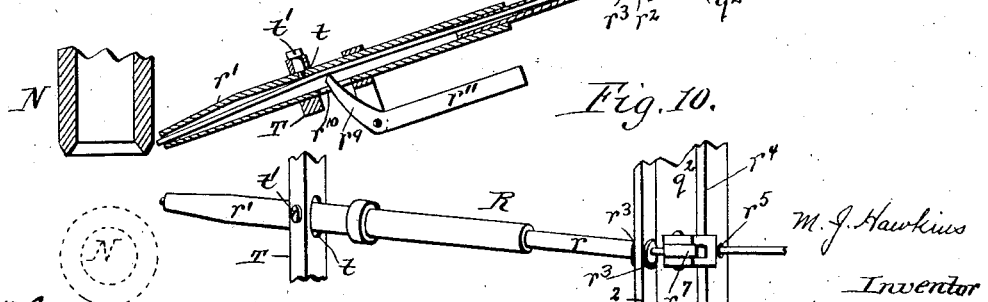

(No Model.) 6 Sheets—Sheet 4.
M. J. HAWKINS.
MACHINE FOR SOLDERING CAPS ON CANS.
No. 568,849. Patented Oct. 6, 1896.
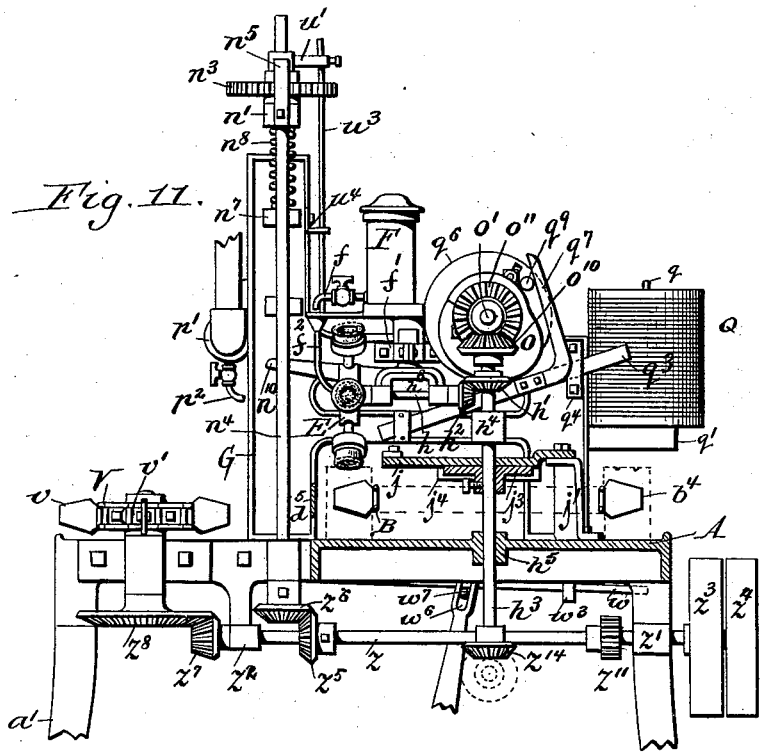
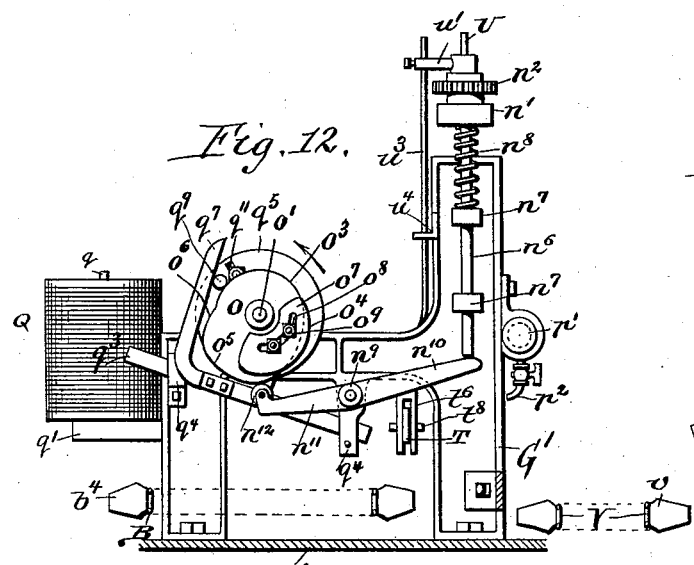
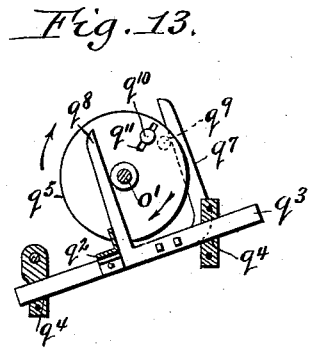

(No Model.) 6 Sheets—Sheet 5.
M. J. HAWKINS.
MACHINE FOR SOLDERING CAPS ON CANS.
No. 568,849. Patented Oct. 6, 1896.
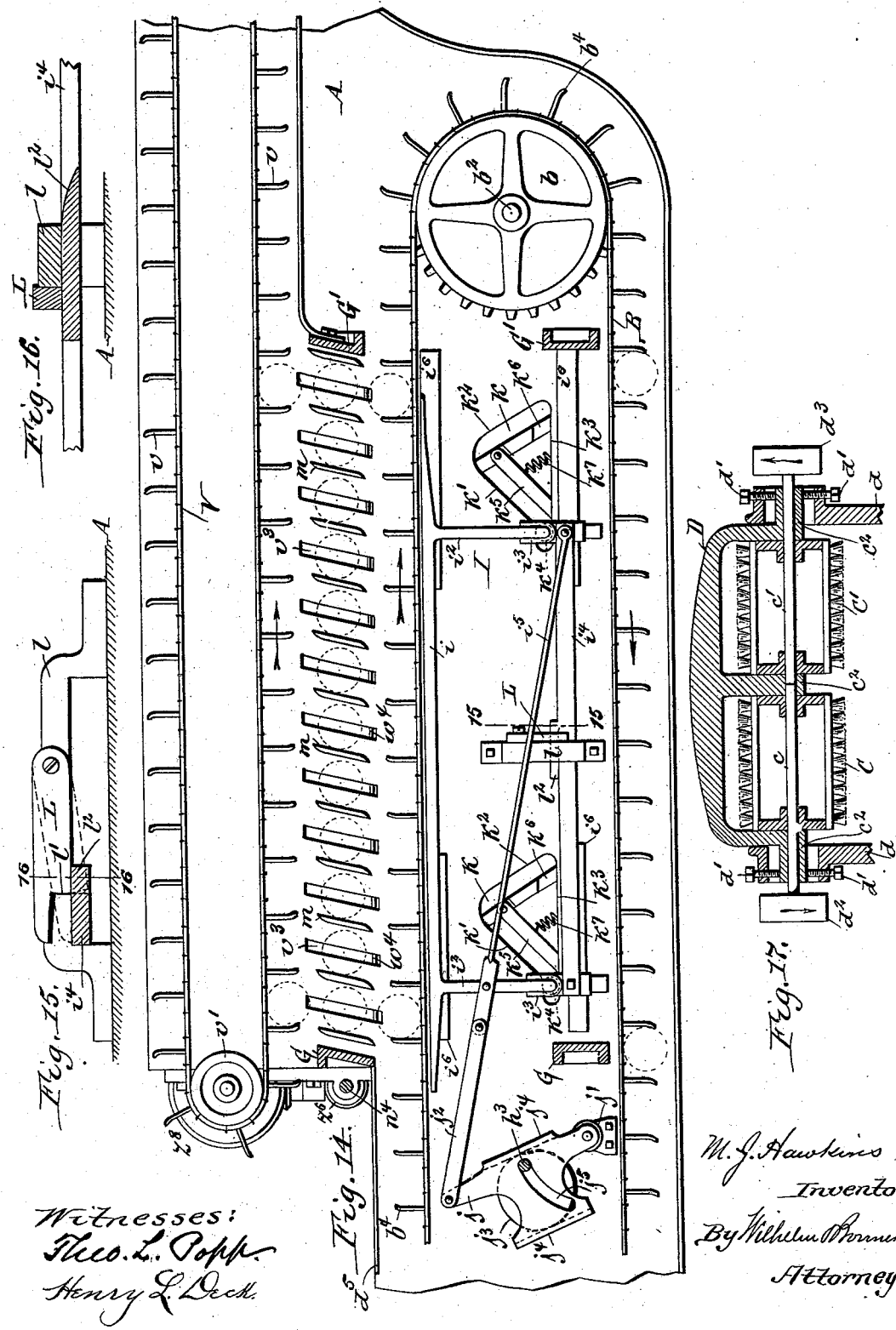
Witnesses:
Theo. L. Popp
Henry L. Deck
M. J. Hawkins
Inventor
By Wilhelm Bonner
Attorneys.

(No Model.) 6 Sheets—Sheet 6.
M. J. HAWKINS.
MACHINE FOR SOLDERING CAPS ON CANS.
No. 568,849. Patented Oct. 6, 1896.
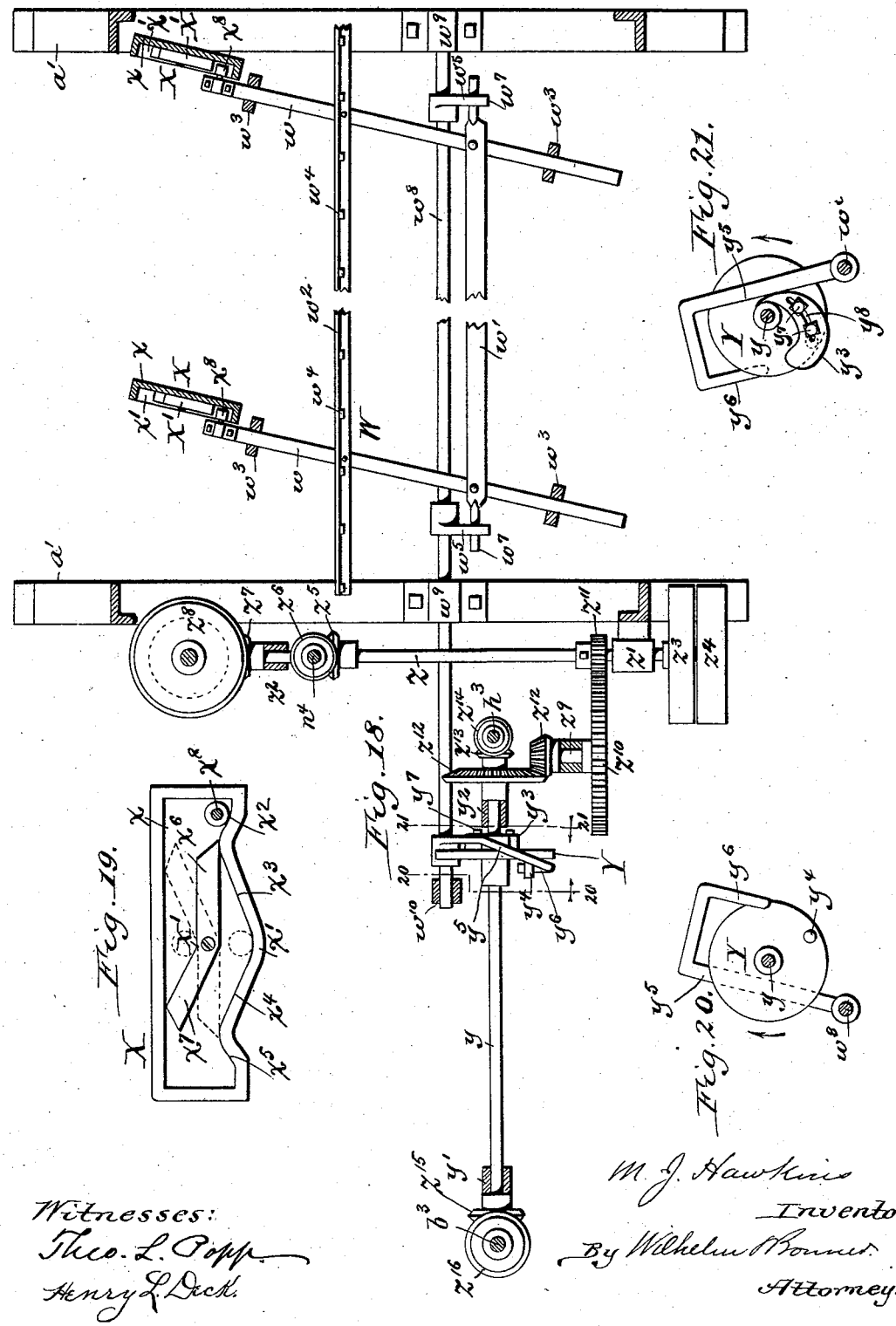

UNITED STATES PATENT OFFICE.

MILLARD J. HAWKINS, OF NEWPORT, NEW YORK.

MACHINE FOR SOLDERING CAPS ON CANS.

SPECIFICATION forming part of Letters Patent No. 568,849, dated October 6, 1896.

Application filed July 5, 1895. Serial No. 554,938. (No model.)

*To all whom it may concern:*

Be it known that I, MILLARD J. HAWKINS, a citizen of the United States, residing at Newport, in the county of Herkimer and State of New York, have invented new and useful Improvements in Machines for Soldering Caps on Cans, of which the following is a specification.

This invention relates to a can-capping machine which performs the operation of wiping the tops of the cans after they are filled and of soldering upon the cans the caps which close the openings in the tops thereof.

My invention has for its objects to improve the wiping devices in such manner that the cans are firmly held in engagement with the carrier during the wiping operation; to improve the construction of the device whereby the fluxing material is applied to the cans and caps preparatory to soldering the caps to the cans; to provide reliable means for shifting the cans from the feed-belt toward the soldering-tools and from the latter to the delivery-belt; to provide simple mechanism for automatically feeding the solder-wire to the soldering-tools, and to improve the machine in various other respects.

In the accompanying drawings, consisting of six sheets, Figure 1 is a front elevation of my improved can wiping and capping machine. Fig. 2 is a top plan view thereof. Fig. 3 is a vertical longitudinal section, on an enlarged scale, in line 3 3, Fig. 2. Fig. 4 is a fragmentary longitudinal section, on an enlarged scale, of the device whereby the ends of the solder-wires are carried toward and from the soldering-tools, the section being taken in line 4 4, Fig. 8. Fig. 5 is a transverse section in line 5 5, Fig. 2, on an enlarged scale, of the fluxing device and adjacent parts. Fig. 6 is a fragmentary horizontal section in line 6 6, Fig. 5. Fig. 7 is a face view of a clamping-disk of one of the fluxing-brushes. Fig. 8 is a vertical transverse section in line 8 8, Fig. 3. Fig. 9 is a fragmentary longitudinal section in line 9 9, Fig. 3, on an enlarged scale, of one of the solder-feeding devices. Fig. 10 is a top plan view thereof. Figs. 11, 12, and 13 are fragmentary vertical transverse sections in lines 11 11, 12 12, and 13 13, Fig. 3, respectively. Fig. 14 is a horizontal section in line 14 14, Fig. 3. Fig. 15 is a transverse section, on an enlarged scale, in line 15 15, Fig. 14. Fig. 16 is a longitudinal section in line 16 16, Fig. 15. Fig. 17 is a vertical transverse section, on an enlarged scale, in line 17 17, Fig. 1. Fig. 18 is a horizontal section, on an enlarged scale, in line 18 18, Fig. 1. Fig. 19 is a sectional elevation, on an enlarged scale, of the shifting device whereby the can-delivering fingers are engaged with and disengaged from the cans. Figs. 20 and 21 are vertical transverse sections in lines 20 20 and 21 21, Fig. 18, respectively.

Like letters of reference refer to like parts in the several figures.

A represents the bed or table of the machine, upon which the cans are supported while being operated upon, and which is provided with supporting-legs $a\ a'$.

B represents a continuously-moving feed-belt arranged lengthwise over the front portion of the table and passing around horizontal sprocket-wheels $b\ b'$, so that the receiving portion of the feed-belt faces forwardly, while the delivery portion of the same faces rearwardly. The sprocket-wheel $b$ is arranged on the right-hand side of the machine and journaled on a vertical arbor $b^2$, secured to the table, while the sprocket-wheel $b'$ is arranged on the left-hand side of the machine and secured to the upper end of a vertical shaft $b^3$, which is journaled in a bearing in the table. The feed-belt is provided with a number of laterally-projecting wings or flights $b^4$. The operator places the cans with the bottom upon the table with the side against the front side of the flights on the front or receiving portion of the feed-belt. The movement of the feed-belt is in the direction of the arrows, Figs. 2 and 14, which causes the cans to be carried around the sprocket-wheel $b'$ in passing from the front portion to the rear portion of said belt. While the cans are passing around the sprocket-wheel $b'$, the cans are subjected to the action of a brushing device whereby the tops of the cans are cleaned and which is constructed as follows:

C C' represent two horizontal brushes whereby the tops of the cans are brushed and cleaned and which are arranged over the bight of the feed-belt passing around the sprocket-wheel $b'$, preferably at right angles to the front and rear portions of the feed-belt. These brushes are arranged axially in line and secured to shafts $c$ $c'$, which are journaled in bearings $c^2$, formed in a yoke D. The latter is supported on standards $d$, secured to the table and capable of vertical adjustment thereon by screws $d'$. The brush-shafts are provided with separate driving-pulleys $d^2$ $d^3$, which are driven in opposite directions, as indicated by the arrows in Fig. 17, so that the front brush C is moved with its lower portion in a direction opposite to that in which the front portion of the feed-belt moves, while the rear brush moves with its lower portion in a direction opposite to that in which the rear portion of the feed-belt moves. This causes the cans to be firmly held against the flights of the feed-belt while being brushed and while changing the direction of their movement in passing around the sprocket-wheel $b'$. After the tops of the cans have been cleaned an attendant places a circular cap or cover over the opening in the top thereof, a box $d^4$, containing a supply of such caps, being preferably arranged on the table adjacent to the brushes.

$d^5$ represents a guard-rail which is arranged on the outer side of the path of the cans as they pass around the sprocket-wheel $b'$ and which prevents the cans from leaving the flights of the feed-belt.

Preparatory to soldering the cap to the can a liquid flux is applied to the same by a fluxing device, which is constructed as follows:

E represents a rotary fluxing-wheel which is arranged over the rear or delivery portion of the feed-belt with its plane parallel with the direction of movement of the belt.

$e$ represents the hub of the fluxing-wheel, which is hollow, as shown in Fig. 5, and provided with a central opening in its rear side, and $e'$ $e'$ are a number of hollow radial arms, which open with their inner ends into the hollow hub. Each of the hollow arms is provided on its outer end with an annular cap or holder $e^2$, along the inner side of which an annular bunch of brush-bristles $e^3$ is arranged.

$e^4$ is a clamping-disk which bears against the inner side of the annular brush and clamps the same against the cap. This disk is fastened to the back of the cap by screws $e^5$ and is provided on its rear side with a number of diametrical grooves $e^6$, Fig. 7.

F, Figs. 1, 2, 3, and 11, represents a receptacle which contains a liquid fluxing material of any suitable and well-known kind and which is provided with a discharge-nozzle $f$. This receptacle is supported by a bracket $f'$, which is secured to a standard G, arranged on the table.

$f^2$ is a tube whereby the fluxing fluid is carried from the nozzle of the receptacle into the hollow hub of the fluxing-wheel. As the wheel rotates the liquid flux flows into each of the hollow arms, and from the latter, through the grooves in the clamping-disks, to the brushes, whereby the brushes are saturated with the liquid. The brushes on the fluxing-wheel are so spaced and the rotary movement of the fluxing-wheel is so timed that the brushes coincide successively with the tops of the cans and travel along with the same as the cans pass underneath the wheel and deposit a proper quantity of flux on the top of each can and the cap thereon. Each brush has about the same diameter as a cap, so that the flux is applied as far as is required for soldering.

The hub of the fluxing-wheel is secured to the rear end of a transverse shaft $h$, which latter is driven at its front end by bevel gear-wheels $h'$ $h^2$ from an upright shaft $h^3$, journaled in bearings $h^4$ $h^5$, arranged, respectively, on the standard G and the table.

$h^6$ represents an adjustable yoke provided with bearings $h^7$, in which the fluxing-wheel shaft is journaled. This yoke is provided with an upwardly-projecting cylindrical stud $h^8$, which is arranged in a split cylindrical socket $h^9$, formed in the outer end of the bracket $f'$. The split portions of this socket are connected by a clamping-screw $h^{10}$. Upon loosening this screw the fluxing-wheel can be raised and lowered for adjusting the same to the height of the cans which are operated upon for taking up wear on the brushes, and the yoke can also be turned for the purpose of bringing the fluxing-wheel shaft into the proper radial position with reference to the upright shaft $h^3$. After the fluxing-wheel has been adjusted to the desired position the clamping-screw $h^{10}$ is tightened and the bevel gear-wheel $h'$ is shifted on the upright shaft $h^3$ to mesh properly with the bevel gear-wheel $h^2$ of the transverse shaft.

After the flux has been applied to the tops of the cans and the caps the cans are moved rearwardly out of engagement with the rear or delivery portion of the feed-belt and carried underneath the soldering-irons by a shifting mechanism which is constructed as follows:

I, Figs. 3, 8, and 14, represents a shifting frame which is arranged between the front and rear portions of the feed-belt, and which is adapted to intermittently disengage the cans from the rear portion of the belt and move them rearwardly. This frame consists, essentially, of two longitudinal shifting bars $i$ $i'$, arranged, respectively, above and below the feed-belt, a pair of arms $i^2$, projecting forwardly from each bar, posts $i^3$, connecting the front ends of the upper arms with the front ends of the lower arms, a longitudinal bar $i^4$, connecting the front ends of the lower arms, and a diagonal brace $i^5$, connecting the lower arm at one end of the frame with the upper arm at the other end of the frame.

$i^6$ represents rails or elevated portions which are formed on the top of the table and upon which the shifting frame rests and slides during its movements.

$j$ represents a horizontal rock-lever whereby a reciprocating movement is imparted to the shifting frame lengthwise of the machine. This rock-lever is pivoted with one end on a standard $j'$, arranged on the table, and is connected at its free end by a link $j^2$ with the shifting frame.

$j^3$ is a cam which engages with its opposite sides against depending flanges $j^4$, formed on the rock-lever for actuating the latter, and which is secured to the upright shaft $h^3$. The rock-lever is provided with a segmental slot $j^5$, through which the shaft $h^3$ passes. In the normal position of the shifting frame the shifting bars stand inside of or forwardly of the rear portion of the feed-belt, so as not to interfere with the movement of the cans with the feed-belt. During the reciprocating movement of the shifting frame lengthwise of the machine the frame also receives a rearward movement transversely of the machine for the purpose of disengaging the cans from the feed-belt and placing them underneath the soldering-tools and a forward or return movement. This transverse movement of the shifting frame is produced as follows:

$k\ k$ represent two recesses formed in the table between the front and rear portions of the feed-belt, each of said recesses having three faces $k'\ k^2\ k^3$, arranged approximately in the form of a triangle, the face $k^3$ being arranged on the front side of the recess and parallel with the feed-belt, while the faces $k'\ k^2$ converge rearwardly from the front and rear ends, respectively, of the face $k^3$.

$k^4$ are rollers or projections arranged on the under side of the shifting frame and extending downwardly into the recesses.

$k^5$ are switch-bars whereby the shifting frame is caused to move obliquely rearward during the effective movement of the same. One of these switch-bars is arranged in each angular recess parallel with the face $k'$ and separated from the latter by an intervening space. The free front end of the switch-bar bears against the front face $k^3$ of the recess, while its rear end is separated by an intervening space from the adjacent face of the recess and pivoted to a bridge $k^6$, which spans the recess on the under side of the table. The switch-bar is normally held with its free end in engagement with the face $k^3$ by a spring $k^7$.

During the effective movement of the shifting frame, which is in the same direction in which the rear portion of the feed-belt moves, the depending rollers of the shifting frame engage against the rear or face sides of the switch-bars, which causes the shifting frame to be moved obliquely rearward. This movement of the shifting frame causes its shifting bars to engage with the cans above and below the rear portion of the feed-belt and move the same rearwardly out of engagement with the feed-belt and upon the soldering-table, underneath the soldering-tools. After the rollers have cleared the switch-bars they come into engagement with the reversely-inclined faces $k^2$ of the recesses, whereby the shifting frame, during the remaining portion of its forwardly-reciprocating movement, is carried obliquely forward until its rollers engage with the rear ends of the faces $k^3$ of the recesses. During the backward-reciprocating movement of the shifting frame its rollers traverse the faces $k^3$ of the recess from the rear to the front end of the latter, and in so doing lift the switch-bars from the front faces $k^3$. When the rollers have passed the switch-bars, the latter are again returned to their normal position by the springs, so that the rollers again engage with the front sides of the switch-bars and cause the shifting frame to move obliquely forward during the subsequent forward movement of the shifting frame. The forward movement of the shifting frame is the same as the forward movement of the feed-belt, so that the shifting bars, while moving the cans out of engagement with the feed-belt, will not retard the movement of the latter.

The faces $k^2$ of the recess are preferably more abrupt than the faces $k'$, which accelerates the oblique outward movement of the shifting frame, thereby enabling the latter to clear the path of the succeeding cans and preventing interference therewith.

L, Figs. 14, 15, and 16, represents a transverse retaining-pawl whereby the shifting frame is held in a retracted position during its backward movement, with its shifting bars arranged inside of the rear portion of the feed-belt, so as to avoid interference with the next following cans. This pawl is pivoted with its rear end to a bridge $l$, which is secured to the table and bears against the front connecting-bar of the shifting frame. The front end of the pawl is adapted to rest on the upper side of the connecting-bar $i^4$, and is provided with a shoulder $l'$, which is adapted to engage with the rear edge of said connecting-bar. When the shifting frame has reached the end of its outward oblique movement preparatory to beginning its longitudinal return movement, the retaining-pawl drops with its shoulder in rear of the connecting-bar and remains in that position during the greater portion of the return stroke of the shifting frame, thereby holding the latter in its retracted position and compelling the frame to move longitudinally during this portion of its movement.

$l^2$ represents a cam which is arranged on the rear side of the connecting-bar in line with the retaining-pawl, and which is adapted to lift the retaining-pawl out of engagement with the connecting-bar during the last portion of the return stroke of the frame, thereby releasing the same preparatory to again moving obliquely rearward during the next following forward stroke of the frame.

The movements of the shifting frame are controlled, first, by the pivoted switch-bars $k^5$, which form oblique front guides, whereby the shifting frame is caused to move toward the soldering-table during the first part of its forward stroke, then by the oblique rear faces $k^2$, which form oblique rear guides, whereby the frame is caused to move away from the soldering-table during the subsequent part of its forward stroke, and, lastly, by the longitudinal face $k^3$ and the retaining-pawl, which causes the frame to move longitudinally during its return stroke. The movement of the shifting frame is so timed that it will disengage the cans in gangs from the feed-belt and move the same upon the soldering-table, which is that portion of the table located underneath the soldering-tools, the construction shown in the drawings being designed for moving the cans in gangs of twelve.

$m$ represents a number of inclined guide-ribs formed transversely on the soldering-table in rear of the delivery portion of the feed-belt and adapted to guide the cans underneath the soldering-tools.

The soldering device whereby the caps are soldered to the tops of the gang of cans is constructed as follows:

N, Figs. 3, 8, 11, and 12, represents vertically-movable soldering-tools which are arranged lengthwise in a row above the soldering-table, where the cans are deposited by the shifting frame, each soldering-tool being axially in line with one of the cans and adapted to solder the cap thereon. Each of the soldering-tools is hollow and provided with an upwardly-projecting hollow shank $n$, which passes loosely through a vertically-movable cross-head $n'$, arranged lengthwise above the soldering-tools. Each of the soldering-tools is provided at its upper end with a gear-wheel $n^2$, which rests on the cross-head and meshes with the gear-wheels of the adjacent tools. The several tools are rotated in unison and continuously by a driving gear-wheel $n^3$, meshing with the gear-wheel of the soldering-tool at one end of the row of tools. The driving gear-wheel $n^3$ is mounted on a vertical shaft $n^4$, journaled in bearings on the cross-head and the table.

The driving gear-wheel is connected with the shaft $n^4$ by a key or spline, so as to compel the driving gear-wheel to turn therewith, but is confined between the top of the cross-head and an overhanging bracket $n^5$, secured to the cross-head, so that the driving gear-wheel is compelled to move vertically with the cross-head independent of its driving-shaft. The cross-head is guided in its vertical movements by depending guide-rods $n^6$, arranged at opposite ends thereof and sliding in lugs $n^7$, formed on standards G G'. The standards are arranged on the table at opposite ends of the gang of soldering-tools. When the cross-head is free, it descends with the soldering-tools by gravity until the tools rest on the cans, and then the cross-head moves downwardly an additional distance, so as to clear the under sides of the gear-wheels of the sol-dering-tools and permit each of the latter to adjust itself to the top of the can which it is operating upon. The downward movement of the cross-head and soldering-tools is cushioned by springs $n^8$, surrounding the guide-rods between the cross-head and the guide-lugs.

$n^9$ are rock-levers whereby the soldering-tools are lifted. These rock-levers are pivoted centrally to the outer sides of the standards G G' and engage with their rear arms $n^{10}$ against the lower ends of the guide-rods, while their front arms $n^{11}$ are provided with rollers $n^{12}$.

O represents cams which engage with the rollers on the front arms of the rock-levers $n^9$ for turning the latter and lifting the soldering-tools. These cams are arranged on a longitudinal shaft $o'$, which is journaled in bearings $o^2$ on the standards G G', and each cam has its face provided with a concentric face $o^3$, against which the rock-lever engages while the cross-head is in its lowest position, an eccentric face $o^4$, which causes the soldering-tools to be disengaged from the cans and lifted through the first portion of their upward movement, an eccentric face $o^5$, whereby the tools are lifted the balance of the upward movement, and an eccentric face $o^6$, whereby the tools are again lowered upon the cans. The eccentric face $o^4$ is formed on a separate section $o^7$, which is made circumferentially adjustable on the main part of the cam by means of screws $o^8$, passing through a curved slot $o^9$, formed in said section or otherwise.

When the soldering-irons are very hot, it is desirable, in order to avoid burning the solder, to raise the irons from the cans sooner than when the tools have a comparatively low temperature. By adjusting the cam-section $o^7$ forwardly or backwardly the beginning of the initial raising movement of the tools can be regulated according to the temperature of the tools. A rotary movement is imparted to the cam-shaft by bevel gear-wheels $o^{10}$ $o^{11}$, meshing with each other and secured, respectively, to the upper end of the vertical shaft $h^3$ and one end of the cam-shaft $o'$.

P represents a heating-chamber inclosing the soldering-tools and supported at its ends on the standards G G'. This chamber is open at its top and bottom, so as to permit the soldering-tools to pass freely through the same, and is provided in its rear side with an opening $p$ opposite each tool.

$p'$ is a fuel-supply pipe secured to the standards lengthwise in rear of the heating-chamber and provided with burners $p^2$ opposite the openings $p$, which direct the flame against the sides of the soldering-tools.

The solder is fed to each soldering-tool by an automatic feeding device, which is constructed as follows, as most clearly shown in Figs. 3, 8, 9, 10, 11, 12, and 13:

Q represents a number of reels or spools of solder-wire which turn on vertical spindles $q$, carried by a shelf $q'$ on the front portion of the standards G G', one spool being provided for each soldering-tool.

$q^2$ represents a feed-bar arranged lengthwise of the machine above the shifting frame and having a transversely-reciprocating movement for feeding the solder-wire to the soldering-tools. The ends of this bar are secured to transverse sliding bars $q^3$, which are guided in ways $q^4$, arranged on the outer sides of the standards.

$q^5$ $q^6$ represent two tappet-disks which are secured to the cam-shaft $o'$, and whereby the sliding bars are moved back and forth. Each of these bars is provided with two upwardly-projecting arms $q^7$ $q^8$, which are arranged on opposite sides of one of the tappet-disks, and the latter is provided with tappets or lugs $q^9$ $q^{10}$ on opposite sides, which are adapted to engage, respectively, with the arms $q^7$ $q^8$ of the sliding bars. When the tappets $q^{10}$ of the tappet-disks engage with the rear arms $q^8$ of the sliding bars, upon turning the disks the feed-bar is moved rearwardly, and when the tappets $q^9$ engage with the front arms $q^7$ the feed-bar is moved forwardly, the tappets being so timed that an interval of rest takes place at the end of the forward and backward movement of the feed-bar.

R represents a number of feeding-tubes for the solder-wires, whereby the solder-wires are carried to the soldering-tools. Each of these tubes consists of two sections $r$ $r'$, which telescope and are capable of sliding one upon the other. The rear or delivery section $r'$ is held against lengthwise movement, but is capable of a lateral movement, while the front or inlet section $r$ is connected loosely at its front end with the feed-bar, so as to be compelled to move back and forth therewith, but is free to follow the lateral movements of the rear section. This loose connection between the front tube-section and the feed-bar may be formed by passing the front end of the section loosely through an opening in a flange $r^2$ on the rear portion of the feed-bar and forming a shoulder $r^3$ on the front tube-section on opposite sides of the flange, as shown in Fig. 9. The front portion of the feed-bar is provided with a flange $r^4$, having an eye or opening $r^5$ in line with each feeding-tube. The solder-wires from the spools pass rearwardly through these eyes, and thence through the sections of the feeding-tubes to the soldering-tools.

$r^6$ represents a number of solder-feed pawls or grippers whereby the solder is unwound from the spools and fed against the soldering-tools during the forward movement of the feed-bar. One of these pawls is arranged in front of each feed-tube and is pivoted on the front flange of the feed-bar, so that it is capable of swinging in a vertical plane. The feed-pawl is provided with an upper arm $r^7$ and a lower arm $r^8$, having a gripping edge which is adapted to bear upon the solder-wire in front of the feed-tube and compel the wire to move forwardly with the feed-bar.

$r^9$ is a detent-pawl whereby retrograde movement of the solder-wire is prevented during the backward movement of the feed-bar, feed-pawl, and front tube-section. This pawl is arranged on the under side of the feed-tube and projects with its jaw upwardly through an opening $r^{10}$, formed in the under side of the rear tube-section. The pawl is pivoted to a hanger on said tube and is provided on the opposite side of its pivot with a weighted arm $r^{11}$, which causes the jaw of the pawl to be held firmly against the under side of the solder-wire in the rear tube-section and hold the wire against backward movement. In order to regulate the amount of solder which is fed to the soldering-iron, the forward movement of the feed-bar and connecting parts are varied according to the amount of solder required. This is accomplished by adjustably securing the tappets $q^{10}$ in radial slots $q^{11}$, formed in the tappet-disks.

During the operation of soldering the caps to the cans the end of the solder-wire must be arranged closely to the soldering-tool and the can; but when the soldering has been finished the end of the solder must be carried away from the can and tool to prevent the solder-wire from becoming attached to the can when the solder on the latter hardens and to prevent the waste of solder which would result if the solder remained in contact with the soldering-tool. For this purpose the free ends of the rear tube-sections are moved laterally and vertically toward and from the tools and cans by the following means:

T represents a longitudinal cross-bar provided with a number of openings $t$, through which the rear tube-sections pass, and $t'$ are screws whereby these sections are pivoted to the cross-bar.

$t^2$ represents an elbow-lever which is pivoted on the inner side of the standard G and connected with its lower arm $t^3$ to one end of the cross-bar T, while its upper arm $t^4$ is connected with the cross-head $n'$ by a connecting-rod $t^5$.

$t^6$ represents a hanger secured to the inner side of the standard G' and provided with an inclined face $t^7$.

$t^8$ is a transverse pin arranged in the opposite end of the cross-bar and resting on the inclined face of the hanger. During the upward movement of the cross-head with the soldering-tools the elbow-lever is turned by reason of its connection with the cross-head, which causes the cross-bar to be moved laterally and upwardly at one end by the elbow-lever, while the opposite end of the cross-bar is moved in approximately the same direction by riding upon the inclined face of the hanger, thereby causing the delivery ends of the solder-tubes to be carried away from the cans and tools to the position indicated in Fig. 10.

When the soldering-tools are again lowered upon the cans, the soldering-tubes are returned to the proper position by the reverse movement of the parts.

U represents retaining-rods whereby the caps are held in place during the operation of soldering the same to the cans and which are arranged in the hollow soldering-tools with their lower ends projecting a short distance below the faces of the tools. These rods bear with their lower ends on the caps of the cans when the same are in place underneath the soldering-tools or enter the openings of the cans when no caps have been placed thereon.

$u'$ represents a forwardly-projecting arm secured to the upper end of each retaining-rod and adapted to rest upon the upper end of the shank of the soldering-tool, thereby limiting the downward movement of the rod with reference to the tool.

$u^2$ represents a releasing or trip plate whereby the solder-feed pawl $r^6$ is disengaged from the solder-wire when the soldering-tool descends upon a can on which no cap has been placed or when no can has been placed underneath the tool. This plate is arranged over the upper arm of the solder-feed pawl and connected by a depending rod $u^3$ with the arm $u'$ of the retaining-rod, so as to move up and down with the retaining-rod.

$u^4$ represents an angle-bar secured lengthwise to the standards and provided with slots $u^5$, in which the lower portion of the trip-plate rods are guided.

When a can provided with a cap has been properly placed underneath the soldering-tool, the retaining-rod during its descent with the soldering-tool strikes the cap before the tool strikes the can. The downward movement of the retaining-rod is thereby arrested, and this causes the trip-plate to be simultaneously arrested in its downward movement and prevents the trip-plate from striking the upper arm of the feed-pawl. The latter therefore remains in engagement with the soldering-wire and feeds the same forward during the subsequent forward movement of the feed-bar. Upon raising the soldering-tools the retaining-rods remain resting on the caps and hold the same in place until the upper ends of the tool-shanks strike the under side of the arms connecting the retaining-rods and trip-plate rods, after which the rods, plates, and tools move upwardly together during the balance of the upward movement. When no cap has been placed on the can which is presented to the soldering-tool, or when no can is placed underneath the tool, the downward movement of the retaining-rod is not arrested and the rod continues to descend until the trip-plate strikes upon the upper arm of the feed-pawl and turns the latter sufficiently to throw its lower arm out of engagement with the solder-wire, as shown by dotted lines in Fig. 9, whereby the forward movement of the pawl with the feed-bar is rendered ineffective and no solder is fed to the tool.

After the caps have been soldered on the cans the latter are carried rearwardly from underneath the soldering-tools into engagement with a delivery-belt V, which is arranged lengthwise in rear of the soldering devices. This belt is provided with laterally-projecting wings $v$, which engage with the cans in the same manner as the wings of the feed-belt and passes around horizontal sprocket-wheels $v'$ $v^2$, journaled on the rear portion of the table.

$v^3$, Figs. 8 and 14, represents transverse slots formed in the soldering-table between the guide-ribs, so that the cans stand over the same when arranged underneath the soldering-tools. These slots are arranged obliquely parallel with the guide-ribs, which are also arranged obliquely for the purpose of enabling the cans to advance while they are moving transversely over the soldering-table toward the delivery-belt, thereby avoiding an abrupt collision of the cans with the forwardly-moving side of the delivery-belt.

W, Figs. 8 and 18, is a transversely-movable shifting frame arranged underneath the table and adapted to move the cans from underneath the soldering-tools into engagement with the delivery-belt. This delivery-frame consists of two transverse bars $w$ $w$ and two longitudinal bars $w'$ $w^2$, connecting the front and rear portions of the transverse bars. The transverse bars are arranged obliquely parallel with the slots and ribs of the soldering-table. This frame is guided in its transverse movements by means of hangers $w^3$, formed on the table and embracing the transverse bars of said frame. The rear longitudinal bar $w^2$ of the shifting frame is provided with fingers $w^4$ on its upper side, which pass upwardly through the slots in the table and engage with the cans for moving them. $w^5$ represents two rock-arms whereby this frame is moved backward and forward. These rock-arms are provided in their upper ends with slots $w^6$, which receive pins $w^7$, formed on the ends of the front longitudinal bar $w'$ of the frame. The rock-arms are secured with their lower ends to a longitudinal rock-shaft $w^8$, which is journaled in bearings $w^9$ on the legs $a'$ and in a hanger $w^{10}$, secured to the table.

X, Figs. 8, 18, and 19, represents two switches whereby the rear portion of the shifting delivery-frame is elevated during its backward movement for bringing the fingers $w^4$ into engagement with the backs of the cans and depressed during its forward movement, so that the fingers will clear the cans. One of these switches is arranged adjacent to the rear end of each transverse bar of this frame and contains a vertical frame $x$, which is secured to the under side of the table in an oblique position parallel with the transverse bars of the frame. This frame is provided along its lower edge with a switch-rail $x'$, which is composed from its front to its rear end of a short ascending front portion $x^2$, a longer descending portion $x^3$, an equally ascending portion $x^4$, and a short descending rear portion $x^5$. A switch-lever $X'$ is pivoted on said frame above the switch-rail, so as to swing vertically. This lever is composed of front and rear arms $x^6$ $x^7$, arranged at an obtuse angle to each other.

$x^8$ is a supporting roller or pin arranged on the rear end of each transverse bar of the shifting frame and adapted to engage with the switch-rail and lever. When the shifting frame is in its foremost position, preparatory to beginning its backward movement for shifting the cans rearward, the supporting-roller rests upon the front end of the adjacent switch-rail, as shown in Figs. 8 and 19, so that the feed-fingers stand below and in front of the cans and the front arm of the switch-lever rests with its free end on the rail by gravity, while its rear arm is elevated, as shown in full lines, Figs. 8 and 19. The front arm is made somewhat heavier for this purpose, so that the switch-lever will always assume this position when free. During the first portion of the backward movement of the shifting frame its rollers ascend over the front portion $x^2$ of the rails and ride up the inclined front ends of the switch-levers to the upper sides thereof, whereby the rear portion of the frame is elevated and the feed-fingers of the frame are projected above the surface of the table in front of the cans. The frame and fingers are held in this elevated position by the switch-lever while the frame continues its rearward movement and until the fingers have shifted the cans from underneath the soldering-tools into engagement with the delivery-belt, and then the rollers drop from the rear ends of the switch-levers to the rear portions of the switch-rails, whereby the rear portion of the frame is lowered and the feed-fingers are depressed below the surface of the table. When the rollers, in their backward movement over the switch-levers, pass the pivots of the same, the weight of the frame depresses the rear arms of the switch-levers until they strike the switch-rail, as represented in dotted lines, Figs. 8 and 19. The upper sides of the front and rear arms of the switch-levers are so formed that when either of them rests on the switch-rail its upper side presents a practically horizontal bearing-surface for the roller. Hence when the roller has depressed the rear arm of the switch-lever the roller continues to move horizontally in passing over the rear arm and until it leaves the rear end of the lever.

In the backward movement of the shifting delivery-frame the rollers ascend at first until they reach the upper surface of the switch-lever, in which position of the rollers the fingers are projected above the table. The rollers then move horizontally to the rear ends of the tilting switch-levers, in which position the fingers have delivered the cans to the delivery-belt. The rollers then descend to the switch-rails, in which position the fingers are depressed below the table, and the rollers finally return along the switch-rail and underneath the switch-levers, during which movement the fingers remain below the surface of the table. The tilting movement of the switch-levers brings their rear ends down upon the switch-rail and enables the rollers to leave the levers easily and without shocks or jars. After the rollers have cleared the rear arms of the switch-levers the rear arms are again elevated and the front arms depressed by the preponderating weight of the front arms, so that during the forward movement of the shifting frame the rollers pass underneath the switch-levers. During the last portion of the forward movement of the rollers they lift the front arms of the switch-levers, and when they have passed the same the front arms again drop into their normal position preparatory to again elevating the rollers for projecting the fingers above the surface of the table.

$Y$ is a rotary cam wheel or disk whereby the rock-shaft $w^8$ is actuated and which is secured to a longitudinal shaft $y$, journaled in hangers $y'$ $y^2$, arranged on the table. This disk is provided on one side with a cam-section $y^3$ and on its opposite side with a tappet $y^4$.

$y^5$ is a rock-arm secured with its lower end to the rock-shaft and adapted to be rocked by the tappet and cam of the cam-disk. The rock-arm is adapted to engage with the cam-section on one side of the cam-disk, and is provided with a hook $y^6$ at its upper end which overhangs the cam-disk and is adapted to be engaged by the tappet on the other side of the cam-disk. Upon turning the cam-disk in the direction of the arrow, Figs. 20 and 21, the cam-section engages with the rock-arm and turns the same, so that the rear shifting frame is moved backwardly through the medium of the intermediate connecting mechanism. After the cam-section clears the rock-arm the tappet engages with the hook thereof and reverses the movement of the rock-arm and the parts connected therewith. The tappet is rigidly secured to the cam-disk, so that the rear shifting frame is always returned to a definite place, but the cam-section is adjustably secured to the cam-disk by screws $y^7$, passing through an eccentric slot $y^8$ in the cam-section, which enables the latter to be adjusted toward or from the center of the cam-disk, according to the extent of the effective movement it is desired to give the rear shifting frame. The cam-section is so formed that the front end of its face is nearest the center of the cam-disk and gradually recedes from the center toward its rear end, which causes the front portion of the cam to bear against the rock-arm at a considerable distance from the fulcrum of said arm and gradually approach the fulcrum as the cam-disk turns, thereby giving the shifting frame a comparatively slow movement at the beginning of its effective movement and gradually accelerating the movement until the end of this movement has been reached, whereby a sudden engagement of the feed-fingers with the cans and displacement of the latter are avoided.

$z$ represents the main driving-shaft, which is journaled transversely underneath the table in bearings $z'$ $z^3$ and provided with tight and loose pulleys $z^3$ $z^4$. Motion is transmitted from this shaft to the soldering-tool shaft by a pair of bevel gear-wheels $z^5$ $z^6$, secured, respectively, to the driving-shaft and the soldering-tool shaft. A similar pair of intermeshing gear-wheels $z^7$ $z^8$ are secured, respectively, to the driving-shaft and the shaft supporting the front sprocket-wheel of the rear delivery-belt, whereby the latter is driven.

$z^9$ is a short counter-shaft journaled in a hanger on the table and provided at one end with a gear-wheel $z^{10}$, which meshes with a pinion $z^{11}$, secured to the driving-shaft, and at its opposite end with a bevel gear-wheel $z^{12}$, which meshes with a similar gear-wheel secured to the longitudinal shaft.

$z^{13}$ is a bevel-gear secured to one end of the longitudinal shaft $y$ and meshing with a bevel gear-wheel $z^{14}$ on the lower end of the upright shaft $h^3$ for actuating the solder-feeding mechanism and the solder-tool-lifting devices. $z^{15}$ $z^{16}$ represent a similar pair of intermeshing bevel gear-wheels secured, respectively, to the other end of its longitudinal shaft $y$ and the lower end of the shaft supporting the sprocket $b'$ of the feed-belt.

The machine herein described and shown embodies in one organization devices for wiping the tops of the cans, devices for applying the flux, devices for transferring the cans from the feed-belt to the soldering-table, devices for feeding the solder-wire and for controlling such feed automatically by the presence of a capped can, and devices for transferring the capped cans from the soldering-table to the delivery-belt.

It is obvious that all of the different improvements herein explained need not necessarily be combined in the same organized machine, but that they, or some of them, can be used in machines differently organized.

I claim as my invention—

1. The combination with a horizontal endless can-carrier, of two brushes arranged side by side over portions of the carrier which move in opposite directions, and mechanism whereby said brushes are rotated in opposite directions, substantially as set forth.

2. The combination with an endless can-carrier, of a yoke arranged over portions of the carrier which move in opposite directions, brushes mounted on separate shafts which are both journaled in said yoke in line with each other, and mechanism whereby said shafts are rotated in opposite directions, substantially as set forth.

3. The combination with a hollow arm or flux-conduit and a brush-holder secured to said arm, of a clamping-disk provided on its back with grooves and secured in said holder, and an annular row of bristles clamped between said disk and holder, substantially as set forth.

4. The combination with a can-carrier, a rotatable fluxing device, a horizontal shaft to which said fluxing device is secured, and a driving device applied to said shaft, of a yoke in which said shaft is journaled and provided with a vertical stud, and a bearing or socket in which said stud can be raised and lowered and also turned, for adjusting said shaft horizontally and vertically, substantially as set forth.

5. The combination with the horizontal feed-belt and the soldering-table, a shifting frame adapted to transfer the cans from the feed-belt to the soldering-table, mechanism whereby said frame is reciprocated longitudinally, and independent guide devices whereby a transverse movement toward and from the soldering-table is imparted to the frame simultaneously with its longitudinal movement, substantially as set forth.

6. The combination with the feed-belt and the soldering-table, of a shifting frame adapted to transfer the cans from the feed-belt to the soldering-table, mechanism whereby said frame is reciprocated longitudinally, an oblique front guide whereby the shifting frame is caused to move toward the soldering-table during the first part of its forward stroke, and an oblique rear guide whereby the shifting frame is caused to move away from the soldering-table during the subsequent part of its forward stroke, substantially as set forth.

7. The combination with the feed-belt and the soldering-table, of a shifting frame adapted to transfer the cans from the feed-belt to the soldering-table, mechanism whereby said frame is reciprocated longitudinally, a pivoted oblique front guide whereby the shifting frame is caused to move toward the soldering-table during the first portion of its forward stroke, a spring whereby said guide is held yieldingly in its normal position, an oblique rear guide whereby the shifting frame is caused to move away from the soldering-table during the subsequent part of its forward stroke, and a longitudinal return-guide whereby the shifting frame is caused to return longitudinally during its backward stroke, substantially as set forth.

8. The combination with the feed-belt and the soldering-table, of a shifting frame adapted to transfer the cans from the feed-belt to the soldering-table, mechanism whereby said frame is reciprocated longitudinally, an oblique front guide whereby the shifting frame is caused to move toward the soldering-table during the first part of its forward stroke an oblique rear guide whereby the shifting frame is caused to move away from the soldering-table during the subsequent part of its forward stroke, a retaining-pawl whereby the shifting frame is compelled to move longitudinally during its return stroke, and means whereby said pawl is released when the shifting frame has reached the oblique front guide, substantially as set forth.

9. The combination with a vertically-movable soldering-tool, of an actuating-cam provided with a lifting-section which is circumferentially adjustable and mechanism connecting the cam with the soldering-tool, whereby the beginning of the lifting movement of the tool can be regulated, substantially as set forth.

10. The combination with a soldering-tool, of a downwardly-projecting rod or bar arranged therein and capable of vertical movement independently of the same, a releasable solder-feed device and a releasing device connected with said rod or bar and controlling said solder-feed device, whereby, when said rod or bar comes in contact with the cap of a can, the releasing device is prevented from affecting the solder-feed device, while, when the rod or bar does not come in contact with a cap, the releasing device shifts the solder-feed to an inoperative position, substantially as set forth.

11. The combination with a vertically-movable soldering-tool, of a downwardly-projecting rod or bar arranged therein and capable of vertical movement with the same and also independently of the same, a solder-feed device, and a releasing device connected with said rod or bar and controlling said solder-feed device, whereby, when said rod or bar encounters the cap of a can as it descends with the soldering-tool it is arrested and the releasing device is thereby prevented from affecting the solder-feed device, while when no cap is encountered said rod or bar continues to descend until the releasing device shifts the solder-feed device to an inoperative position, substantially as set forth.

12. The combination with a vertically-movable soldering-tool, of a downwardly-projecting rod arranged therein and capable of vertical movement with the same and also independently of the same, a solder-wire guide, a reciprocating feed-pawl and a releasing-plate arranged over said pawl and connected with said rod or bar by a depending rod, substantially as set forth.

13. The combination with a soldering-tool, of a feed-bar capable of movement toward and from said tool, a feed-pawl pivoted to said feed-bar, and a telescopic solder-wire feed-tube composed of a section connected with said feed-bar and a section supported adjacent to the soldering-tool, substantially as set forth.

14. The combination with a soldering-tool, of a solder-wire feed-tube, a solder-feed device, a support to which the inlet end of said tube is loosely connected and means whereby the delivery end of said tube is swung away from the soldering-tool after the solder has been fed against the soldering-tool, substantially as set forth.

15. The combination with a vertically-movable soldering-tool and a cross-head whereby the tool is lifted, of a solder wire feed-tube, a support on which the delivery portion of said tube rests, and a lever and rod whereby a laterally-ascending movement is imparted to said feed-tube from said cross-head substantially as set forth.

16. The combination with a vertically-movable soldering-tool and a cross-head whereby the tool is lifted, of a solder-wire feed-tube composed of an inlet portion and delivery portion connected by a telescopic joint, means whereby the delivery portion is connected with said cross-head and swung away from the tool after the solder has been fed against the same, a feed-bar with which the inlet portion of the tube is loosely connected, and a feed-pawl mounted on said feed-bar, substantially as set forth.

17. The combination with a solder-wire feed-tube composed of a stationary delivery-section and an inlet-section capable of longitudinal telescopic movement with reference to said delivery-section, of a detent-pawl attached to the delivery-section of said tube, a feed-bar connected with the inlet-section of said tube, and a feed-pawl mounted on said feed-bar, substantially as set forth.

18. The combination with the soldering-table and the delivery-belt, of a transversely-reciprocating shifting frame whereby the cans are transferred from the soldering-table to the delivery-belt, and mechanism whereby the frame is elevated during its effective stroke and lowered during its return stroke, substantially as set forth.

19. The combination with the soldering-table and the delivery-belt, of a transversely-reciprocating shifting frame whereby the cans are transferred from the soldering-table to the delivery-belt, and switch-rails and tilting switch-levers, whereby said frame is elevated during its effective stroke and lowered during its return stroke, substantially as set forth.

20. The combination with the soldering-table provided with transverse oblique guide ribs and slots, and the delivery-belt, of a shifting frame composed of transverse oblique bars and longitudinal bars, the rear bar of which is provided with pins which are adapted to project through said slots, and transverse oblique guide devices whereby the rear ends of said transverse bars are raised during their forward stroke and lowered during their return stroke, substantially as set forth.

21. The combination with the soldering-table, the delivery-belt, and the shifting frame whereby the cans are transferred from said table to said belt, of a driving-shaft, an actuating-cam adjustably secured thereto and effecting the forward stroke of said shifting frame, a tappet whereby the return stroke is effected, and a rock-shaft and rock-arm which are actuated by said adjustable cam and tappet and which actuate said shifting frame, substantially as set forth.

Witness my hand this 25th day of June, 1895.

MILLARD J. HAWKINS.

Witnesses:
JNO. J. BONNER,
ELLA R. DEAN.